(12) United States Patent  (10) Patent No.: US 12,301,983 B2
Lu et al.  (45) Date of Patent: May 13, 2025

(54) CONTENT OPERATION METHOD AND DEVICE, TERMINAL, AND STORAGE MEDIUM

(71) Applicant: GUANGDONG OPPO MOBILE TELECOMMUNICATIONS CORP., LTD., Guangdong (CN)

(72) Inventors: Yinting Lu, Guangdong (CN); Runda Dai, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 160 days.

(21) Appl. No.: 17/896,948

(22) Filed: Aug. 26, 2022

(65) Prior Publication Data

US 2022/0417417 A1    Dec. 29, 2022

Related U.S. Application Data

(63) Continuation of application No. PCT/CN2021/074066, filed on Jan. 28, 2021.

(30) Foreign Application Priority Data

Feb. 27, 2020 (CN) .......................... 202010123331.X

(51) Int. Cl.
H04N 23/63 (2023.01)
H04N 1/00 (2006.01)

(52) U.S. Cl.
CPC ....... H04N 23/633 (2023.01); H04N 1/00424 (2013.01)

(58) Field of Classification Search
CPC .... H04N 23/633; H04N 23/631; H04N 23/62; H04N 1/00424; G06F 3/04817;
(Continued)

(56) References Cited

U.S. PATENT DOCUMENTS

2009/0037605 A1\* 2/2009 Li ......................... G06F 3/0481
                                                       709/246
2013/0222663 A1   8/2013 Rydenhag et al.
(Continued)

FOREIGN PATENT DOCUMENTS

CN    101924892 A    12/2010
CN    103677609 A     3/2014
(Continued)

OTHER PUBLICATIONS

Chinese Second Office Action, Chinese Application No. 202180017457.1, mailed Jan. 10, 2024 (13 pages).
(Continued)

*Primary Examiner* — Timothy J Henn
*Assistant Examiner* — John H Morehead, III
(74) *Attorney, Agent, or Firm* — Young Basile Hanlon & MacFarlane, P.C.

(57) ABSTRACT

Described are a content operation method, a terminal, and a storage medium. The content operation method includes: displaying a camera interface; wherein the camera interface contains a target thumbnail, the target thumbnail being a thumbnail corresponding to a target content, the target content including a recently taken photo or video; displaying at least one shortcut operation control near to the target thumbnail, in response to a trigger operation on the target thumbnail; wherein each shortcut operation control is configured to trigger a certain operation on the target content; and displaying a target content operation interface in response to a trigger operation on a target shortcut operation control of the at least one shortcut operation control; wherein the target content operation interface corresponds to the target shortcut operation control, and the target content operation interface contains the target content.

19 Claims, 8 Drawing Sheets

(58) Field of Classification Search
CPC .. G06F 3/0482; G06F 3/04845; G06F 3/0481; G06F 3/0484
See application file for complete search history.

(56) References Cited

U.S. PATENT DOCUMENTS

2016/0378277 A1* 12/2016 Cho .................... G06F 3/04886 715/814
2018/0213144 A1 7/2018 Kim et al.

FOREIGN PATENT DOCUMENTS

| | | | |
|---|---|---|---|
| CN | 103853415 | A | 6/2014 |
| CN | 103870255 | A | 6/2014 |
| CN | 104980659 | A | 10/2015 |
| CN | 105430168 | A | 3/2016 |
| CN | 105549814 | A | 5/2016 |
| CN | 105681648 | A | 6/2016 |
| CN | 106131394 | A | 11/2016 |
| CN | 106293338 | A | 1/2017 |
| CN | 106791390 | A | 5/2017 |
| CN | 108153900 | A | 6/2018 |
| CN | 108170348 | A | 6/2018 |
| CN | 108288054 | A | 7/2018 |
| CN | 108415752 | A | 8/2018 |
| CN | 108769374 | A | 11/2018 |
| CN | 108804196 | A | 11/2018 |
| CN | 109040474 | A | 12/2018 |
| CN | 109164964 | A | 1/2019 |
| CN | 109213400 | A | 1/2019 |
| CN | 109445572 | A | 3/2019 |
| CN | 110471606 | A | 11/2019 |
| CN | 110618975 | A | 12/2019 |
| CN | 111371988 | A | 7/2020 |
| EP | 3349115 | A1 | 7/2018 |

OTHER PUBLICATIONS

Chinese First Office Action with English Translation for CN Application 202180017457.1 mailed Jul. 11, 2023. (14 pages).
Extended European Search Report for EP Application 21761460.1 mailed Jun. 29, 2023. (08 pages).
Chinese First Office Action with English Translation for CN Application 202010123331.X mailed Jan. 6, 2021. (20 bages).
Chinese Notification to Grant Patent Right for Invention with English Translation for CN Application 202010123331.X mailed Jun. 25, 2021. (7 pages).
International Search Report and Written Opinion with English Translation for PCT Application PCT/CN2021/074066 mailed Apr. 19, 2021. (15 pages).

* cited by examiner

CONTENT OPERATION METHOD AND DEVICE, TERMINAL, AND STORAGE MEDIUM

CROSS-REFERENCE TO RELATED APPLICATION(S)

The present application is a continuation-application of International (PCT) Patent Application No. PCT/CN2021/074066, filed on Jan. 28, 2021, claims priority of Chinese patent application No. 202010123331.X, filed on Feb. 27, 2020, the entire contents of both of which are hereby incorporated by reference.

TECHNICAL FIELD

The present disclosure relates to the field of terminal technologies, and in particular to a content operation method, a device, a terminal, and a storage medium.

BACKGROUND

A camera is a basic function of a terminal. After a user finishes taking photos or videos in the camera application, the terminal will automatically save the photos or videos taken to an album application for subsequent viewing or preset operations by the user.

In the related art, if the user needs to share the finished photos or videos to other applications, when the user finishes taking photos in the camera interface, he/she needs to exit the camera interface, open the album application, and share the shot contents in the album interface.

Obviously, the content sharing operation in the related art requires switching between the camera interface and the album interface, which is a tedious operation.

SUMMARY

The present disclosure provides a content operation method, a device, a terminal, and a storage medium.

In a first aspect, the present disclosure provides a content operation method, including: displaying a camera interface; wherein the camera interface contains a target thumbnail, the target thumbnail being a thumbnail corresponding to a target content, the target content including a recently taken photo or video; displaying at least one shortcut operation control near to the target thumbnail, in response to a trigger operation on the target thumbnail; wherein each shortcut operation control is configured to trigger a certain operation on the target content; and displaying a target content operation interface in response to a trigger operation on a target shortcut operation control of the at least one shortcut operation control; wherein the target content operation interface corresponds to the target shortcut operation control, and the target content operation interface contains the target content.

In a second aspect, the present disclosure provides a terminal, including a processor and a memory; wherein the memory stores at least one instruction configured to be executed by the processor to perform the content operation method as described above.

In a third aspect, the present disclosure provides a non-transitory computer-readable storage medium of a terminal, storing at least one instruction configured to be executed by a processor to perform the content operation method as described above.

DETAILED DESCRIPTION

In order to make the objectives, technical solutions, and advantages of the present disclosure clearer, the implementation manners of the present disclosure will be further described in detail below in conjunction with the accompanying drawings.

The term "plurality" mentioned herein means two or more. The term "and/or" describes an association relationship of associated objects, indicating that there may be three types of relationships. For example, A and/or B may mean: A alone exists, A and B exist at the same time, and B exists alone. The character "/" generally indicates that the associated objects before and after are in an "or" relationship.

Figure 1:
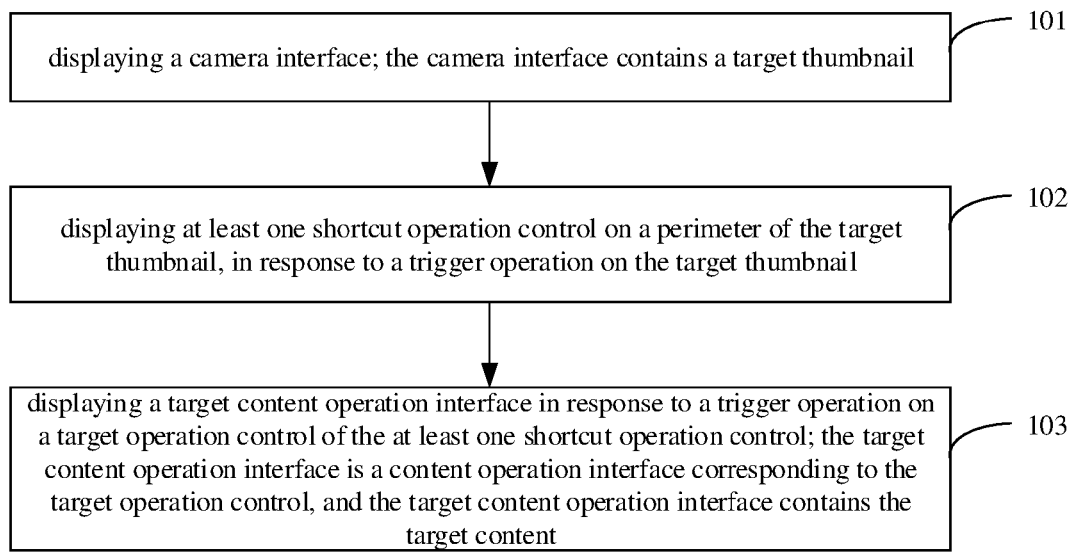
FIG. 1 is a flowchart of a content operation method according to an embodiment of the present disclosure.

Referring to FIG. 1, FIG. 1 is a flowchart of a content operation method according to an embodiment of the present disclosure. The embodiment of the present disclosure takes the method performed by a terminal as an example for description, and the method includes operations at blocks illustrated herein.

At block 101: displaying a camera interface; the camera interface contains a target thumbnail.

The target thumbnail is a thumbnail corresponding to a target content, and the target content may include a recently taken photo or video. For example, when a user enters the camera interface, the target content corresponds to a picture just took or a video just recorded; or when the user enters the camera interface without shooting or recording, the target content corresponds to a last-taken photo or a last-recorded video when entering the camera interface last time. In some embodiments, the camera interface displays the target thumbnail of the most recent photo or displays the target thumbnail of the most recent video.

In some embodiments, when the user clicks on a camera application control, the terminal receives the click operation on the camera application control, and the camera interface is displayed on the current interface. The camera interface contains the target thumbnail corresponding to the target content. The user may take pictures and videos and perform other operations in the camera interface.

In some embodiments, the camera interface may further include a shooting control, a setting controls, a lens switching control, etc. The embodiments do not limit the specific controls included in the camera interface.

Figure 2:
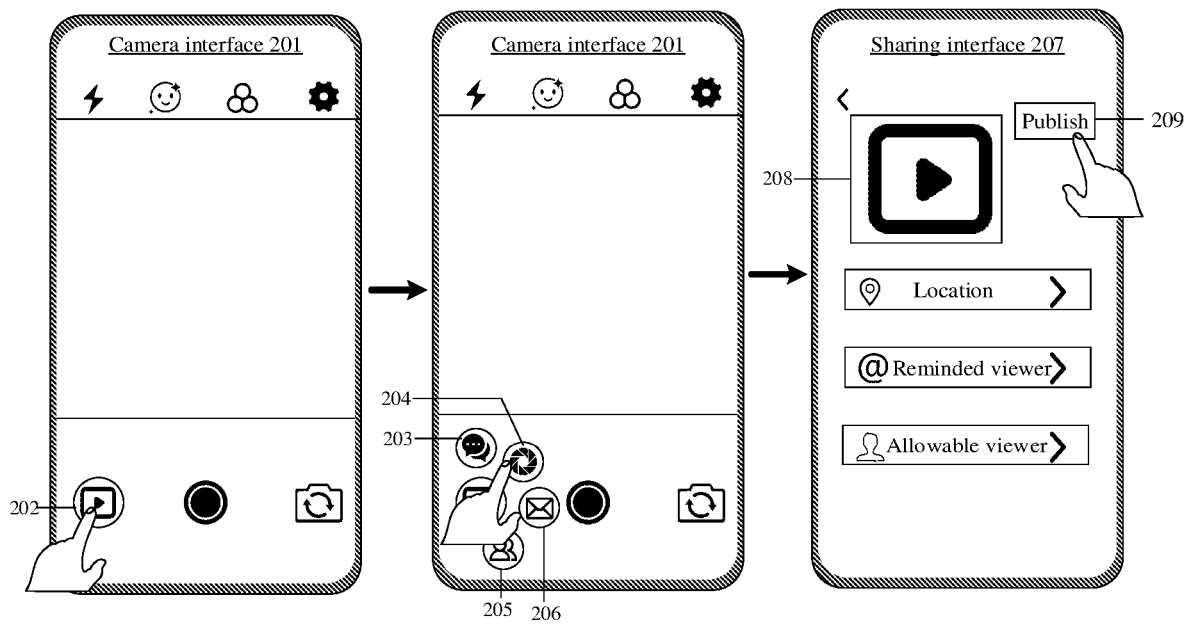
FIG. 2 is a schematic process view of a content operation method according to an embodiment of the present disclosure.

Schematically, as shown in FIG. 2, when the user clicks on the camera application control, the terminal receives the click operation on the camera application control, and the camera interface 201 is displayed on the current interface. The camera interface 201 contains the target thumbnail 202 corresponding to the target content.

At block 102: displaying at least one shortcut operation control on a perimeter of the target thumbnail, in response to a trigger operation on the target thumbnail.

Regarding the trigger operation, in some embodiments, the user may click on the target thumbnail, long press the target thumbnail, or double-click the target thumbnail, etc. The embodiments of the present disclosure do not limit the type of the trigger operation.

The shortcut operation control is configured to trigger a preset operation on the target content. For example, the shortcut operation controls may be different sharing controls to jump to sharing interfaces corresponding to different applications for performing a sharing operation; the shortcut operation control may be a control for text or image identification of the target content to jump to a text identification interface for performing a identification operation; the shortcut operation control may an upload control to jump to a corresponding application for performing an upload operation; or the shortcut operation control may be an edit control to perform an editing operation on the target content, etc. The embodiments do not limit the type of the shortcut operation control.

In some embodiments, after the user long presses the target thumbnail, the terminal receives a trigger operation on the target thumbnail, the at least one shortcut operation control may be displayed on the perimeter of the target thumbnail, such that the user can trigger a shortcut operation control to perform a corresponding preset operation.

In some embodiments, in order to avoid blocking the viewfinder screen, the at least one shortcut operation control is displayed on the perimeter of the target thumbnail and in a region outside a viewfinder screen.

Schematically, as shown in FIG. 2, after the user clicks on the target thumbnail 202 in the camera interface 201, the terminal receives a trigger operation on the target thumbnail 202, the at least one shortcut operation control may be displayed on the perimeter of the target thumbnail 202, for example, different sharing controls: a first sharing control 203, a second sharing control 204, a third sharing control 205, and a fourth sharing control 206.

In some embodiments, the display form of the target thumbnail may be displayed around the perimeter of the target thumbnail (as shown in FIG. 2), or may be displayed by sliding up and down, etc. The embodiments of the present disclosure do not limit the display form of the shortcut operation control.

Figure 3:
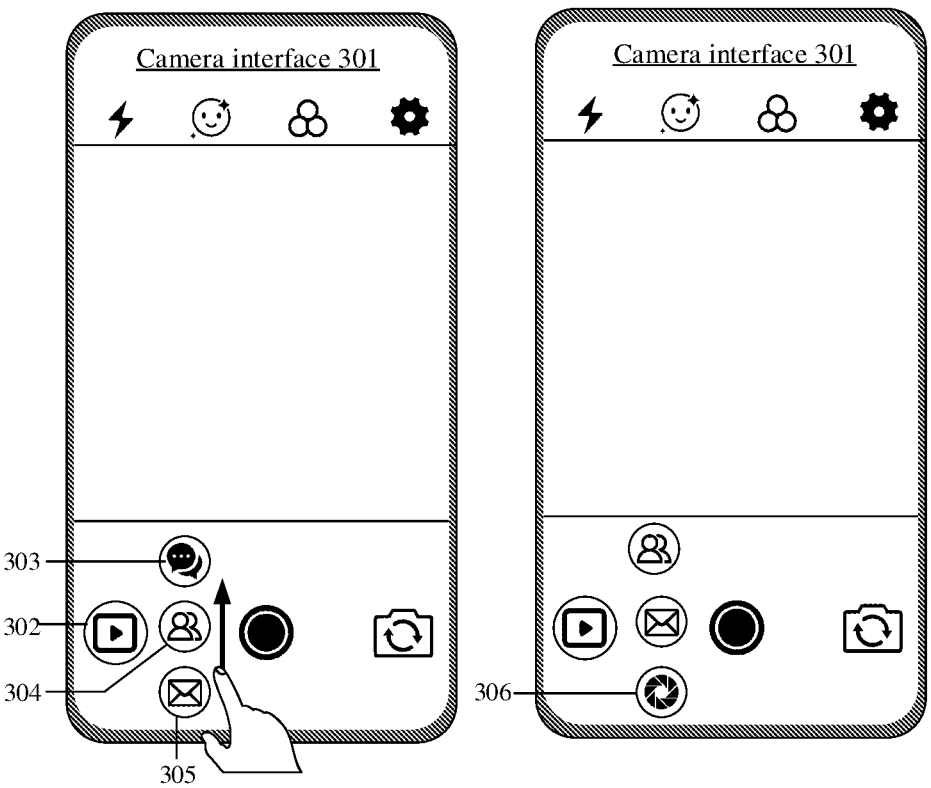
FIG. 3 is a schematic view of a display process of sliding up and down to display a shortcut operation control according to an embodiment of the present disclosure.

Schematically, as shown in FIG. 3, FIG. 3 is a schematic view of a display process of sliding up and down to display a shortcut operation control according to an embodiment of the present disclosure. When the terminal receives a trigger operation on the target thumbnail 302 in the camera interface 301, the at least one shortcut operation control may be displayed on the perimeter of the target thumbnail 302. Due to the limitation of a display region of the shortcut operation control, only three shortcut operation controls are currently displayed, i.e., a first shortcut operation control 303, a second shortcut operation control 304, and a third shortcut operation control 305. When the user slides in a direction shown by the arrow, the terminal receives the corresponding sliding operation, a fourth shortcut operation control 306 may be displayed progressively upwards in the direction shown by the arrow, and the first shortcut operation control 303 is accordingly canceled.

At block 103: displaying a target content operation interface in response to a trigger operation on a target operation control of the at least one shortcut operation control; the target content operation interface is a content operation interface corresponding to the target operation control, and the target content operation interface contains the target content.

In some embodiments, the user may click on any shortcut operation control, and the terminal receives the trigger operation for the target operation control, such that the target content operation interface may be displayed on an upper layer of the current interface, or the screen jumps directly to the content operation interface corresponding to the target operation control.

For example, in a case where the shortcut operation control is a sharing control shared to Moments, the user may click the sharing control to trigger the terminal to directly display a Moments sharing interface, such that the user can directly perform subsequent sharing operations in the Moments sharing interface; in a case where the shortcut operation control is an editing control, the user may click on the editing control, and the terminal may directly jump to display an editing interface, such that the user can perform editing operations in the editing interface.

Schematically, as shown in FIG. 2, when the user clicks on the second sharing control 204, the terminal receives a trigger operation on the second sharing control 204, and a sharing interface 207 corresponding to the second sharing control 204 may be directly displayed. The sharing interface 207 contains the target content 208, and the user may click a publish control 209 to perform the sharing operation of the target content 208 in the sharing interface 207.

In some embodiments, when the user completes related operations in the content operation interface, he/she may return to the original camera interface. At this time, when he/she needs to retract the shortcut operation controls, he/she may press and hold the target thumbnail again, or click the target thumbnail again. The embodiments of the present disclosure do not limit the trigger mode of retracting the shortcut operation control.

In summary, in the embodiments of the present disclosure, after the user performs a shooting operation in the camera interface, the terminal may display the target content obtained by shooting in the camera interface in the form of target thumbnail; when the user needs to perform a preset operation (e.g., sharing operation) on the target content, he or she may directly click or long press the target thumbnail on the camera interface, the terminal receives a trigger operation on the target thumbnail, and at least one shortcut operation control each configured to perform a corresponding operation on the target content is displayed on the perimeter of the target thumbnail; when the user clicks on any shortcut operation control, the terminal receives a trigger operation on the target operation control of the shortcut operation control, and the content operation interface corresponding to the target operation control is displayed such that the user can complete the preset operation directly in the content operation interface. By displaying the shortcut operation control directly on the perimeter of the target thumbnail in the camera interface, the operation of the target content may be completed without switching to the album interface, such that the process of realizing the content operation is reduced and the efficiency of preset operation on the target content is improved compared to the related art.

In some embodiments, the displaying at least one shortcut operation control on the perimeter of the target thumbnail in response to a trigger operation on the target thumbnail includes operations as followed.

Obtaining a shooting time of the target content in response to the trigger operation on the target thumbnail.

Displaying the at least one shortcut operation control on the perimeter of the target thumbnail in response to a time interval between the shooting time and a current time being less than a first time threshold.

In some embodiments, the displaying a target content operation interface in response to a trigger operation on a target operation control of the at least one shortcut operation control includes operations as followed.

Determining an associated content corresponding to the target content in response to the trigger operation on the target operation control and in response to the target operation control being a sharing control; a time interval between a shooting time of the associated content and a shooting time of the target content is less than a second time threshold.

Displaying the target content operation interface; the target content operation interface is a sharing interface, and the sharing interface includes the target content and the associated content.

In some embodiments, the displaying the shortcut operation control on the perimeter of the target thumbnail includes operations as followed.

Obtaining a first shortcut operation control that is preset.

Displaying the first shortcut operation control on the perimeter of the target thumbnail.

In some embodiments, the displaying the shortcut operation control on the perimeter of the target thumbnail includes operations as followed.

Obtaining a content type of the target content; the content type includes at least one of: a text picture, a scene picture, a portrait picture, a short video, and a long video.

Determining a second shortcut operation control corresponding to the content type according to a preset correspondence relationship; the preset correspondence relationship is a correspondence relationship between the content type and the shortcut operation control.

Displaying the second shortcut operation control on the perimeter of the target thumbnail.

In some embodiments, the displaying the second shortcut operation control on the perimeter of the target thumbnail includes operations as followed.

Displaying each second shortcut operation control on the perimeter of the target thumbnail, in response to the number of the second shortcut operation controls being less than a number threshold.

Dividing the second shortcut operation controls into at least two types according to operation types corresponding to the second shortcut operation controls, in response to the number of the second shortcut operation controls being greater than the number threshold; the operation types include at least one of: content sharing, content editing, and content identifying; displaying an operation type identification on the perimeter of the target thumbnail; displaying the second shortcut operation control matching the operation type identification on the perimeter of the target thumbnail, in response to a trigger operation on the operation type identification.

In some embodiments, the method further includes operations as followed.

Obtaining a historical operation on a sample content; the historical operation is an operation performed on the sample content in a user interface other than the camera interface.

Updating the preset correspondence relationship according to a content type corresponding to the sample content and the shortcut operation control corresponding to the historical operation.

In some embodiments, the displaying a target content operation interface in response to a trigger operation on a target operation control of the at least one shortcut operation control includes operations as followed.

Switching to display the target content operation interface operation, in response to the trigger operation on the target operation control and the terminal being in a non-shooting state.

Displaying a floating window on an upper layer of the camera interface, in response to the trigger operation on the target operation control and the terminal in a shooting state; the floating window contains the target content operation interface, and the shooting state is maintained during the display of the floating window.

In some embodiments, the displaying at least one shortcut operation control on a perimeter of the target thumbnail in response to a trigger operation on the target thumbnail further includes operations as followed.

Displaying the at least one shortcut operation control on the perimeter of the target thumbnail and cancelling the display of a shooting control, in response to the trigger operation on the target thumbnail; the shooting control includes at least one of: a shutter control, a lens switching control, and a shooting mode selection control.

In some embodiments, the preset operation includes at least one of a content sharing operation, a content editing operation, and a content identifying operation.

In some embodiments, due to the limitation of the display region of the camera interface, only the most recent video or picture is displayed in the target thumbnail. When the shortcut operation control is a sharing control, each sharing can only target one target content corresponding to the target thumbnail. When the user's current sharing operation targets multiple target contents, multiple subsequent jump operations are required. Therefore, to improve the convenience of performing content operations, in some embodiments, the content associated with the target content may be obtained, and the target content and the associated content may be shared at the same time for the above-mentioned sharing operation.

Figure 4:
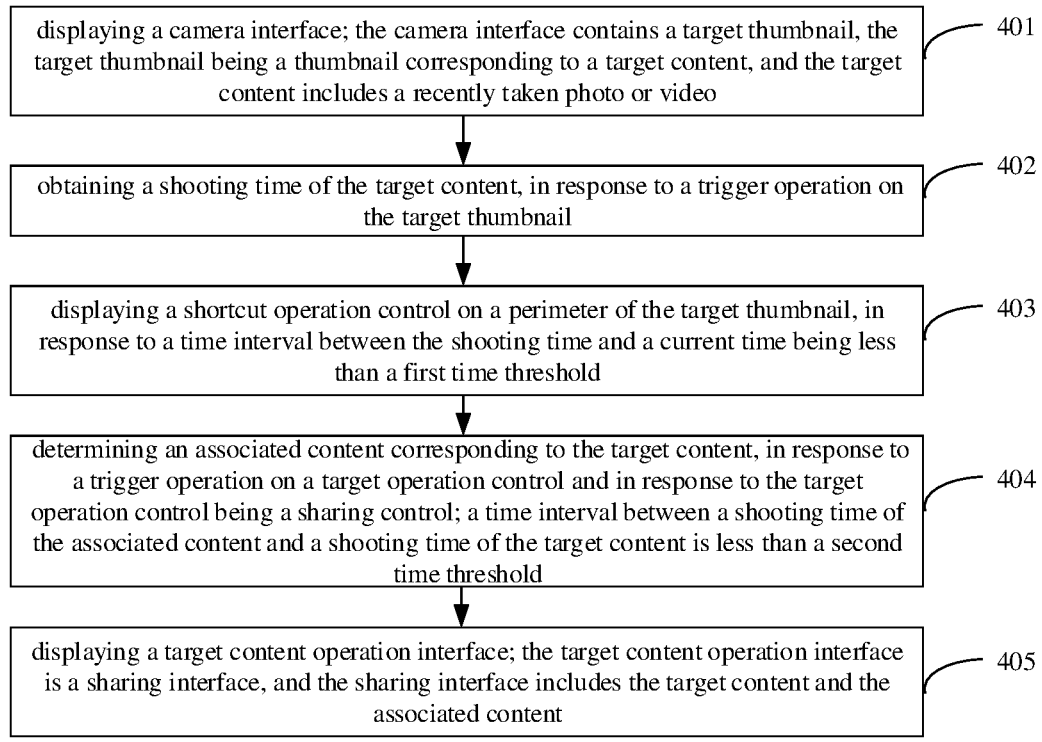
FIG. 4 is a flowchart of a content operation method according to another embodiment of the present disclosure.

Referring to FIG. 4, FIG. 4 is a flowchart of a content operation method according to another embodiment of the present disclosure. The method includes operations at blocks illustrated herein.

At block 401: displaying a camera interface; the camera interface contains a target thumbnail, the target thumbnail being a thumbnail corresponding to a target content, and the target content includes a recently taken photo or video.

For the implementation of this step, reference may be made to step 101, which will not be repeated herein.

At block 402: obtaining a shooting time of the target content, in response to a trigger operation on the target thumbnail.

In some embodiments, in a case where the shooting time of the target content is long before the current time, when the user clicks on the target thumbnail, the user may only need to preview the target content corresponding to the target thumbnail, and there is no need to perform preset operations on the target thumbnail. In a case where the target content has just been shot, when the user clicks on the target thumbnail, the user may need to perform a preset operation on the target content. Therefore, in order to make the timing of triggering the target thumbnail to display the shortcut operation control more in line with the user's needs, in some embodiments, after the user clicks on the target thumbnail, the terminal receives the trigger operation on the target thumbnail and determines the shooting time of the target content for subsequent use as a basis for determining whether to display the shortcut operation control.

At block 403: displaying a shortcut operation control on a perimeter of the target thumbnail, in response to a time interval between the shooting time and a current time being less than a first time threshold.

The first time threshold may be set by the developer or customized by the user. For example, the first time threshold may be 10 minutes.

In some embodiments, after the terminal obtains the shooting time of the target content and the current time and calculates the time interval, when the time interval is less than the first time threshold, the shortcut operation control is displayed on the perimeter of the target thumbnail; and when the time interval is greater than or equal to the first time threshold, the shortcut operation control is not displayed, and the interface for previewing the target content may be directly entered.

At block 404: determining an associated content corresponding to the target content, in response to a trigger operation on a target operation control and in response to the target operation control being a sharing control; a time interval between a shooting time of the associated content and a shooting time of the target content is less than a second time threshold.

The user may not only target a single target content when performing the sharing operation, and when only one target content is shared each time, the user needs to perform multiple repeated operations, resulting in a cumbersome sharing operation. Therefore, in some embodiments, when the terminal receives the trigger operation on the target operation control and when the target operation control is a sharing control, the associated content corresponding to the target content may be determined to improve the efficiency of the sharing operation, so as to realize the simultaneous sharing operation of the target content and the associated content.

Regarding the determination method of the associated content, when the user enters the camera interface to perform multiple shooting operations, multiple target contents may be obtained, but the camera interface may only display the last target content. When the terminal receives the sharing operation of the last target content, it may be considered that the user needs to share multiple target contents just taken to other applications. Therefore, in some embodiments, the content of which the shooting time interval with the target content is less than the second time threshold may be determined as the associated content.

The second time threshold may be preset by the developer or customized by the user. For example, the second time threshold may be 5 s.

In some embodiments, the associated content may be content that has a high degree of similarity to the target content, or the associated content and the target content may have the same keywords, characters, or scenery. For example, the associated content and the target content have a same target person. The terminal may apply a neural network model to perform content identification, thereby determining the associated content with similar content based on the content identification result, which is not limited in the embodiments.

It should be noted that in other possible implementations, the associated content may be content that satisfies the content similarity condition and the shooting time interval condition, as above, at the same time, which will not be repeated in the embodiments.

At block 405: displaying a target content operation interface; the target content operation interface is a sharing interface, and the sharing interface includes the target content and the associated content.

In some embodiments, after the terminal determines the associated content corresponding to the target content, when the sharing interface corresponding to the sharing operation control is displayed, the target content and the associated content may be directly displayed on the sharing interface at the same time.

In some embodiments, when the user decided that some associated content does not need to be shared, he/she may directly delete the undesired associated content in the sharing interface.

In the embodiments, by setting the first time threshold, the terminal can determine whether it needs to display the shortcut operation control on the perimeter of the target thumbnail when receiving a trigger operation on the target thumbnail, such that whether to display the shortcut operation control is more in line with the user's needs. In addition, by setting the second time threshold, the terminal can determine the associated content corresponding to the target content according to the second time threshold, such that the terminal may display the target content and the associated content in the sharing interface at the same time when it receives a trigger operation on the sharing operation control, which may improve the efficiency of the sharing operation.

In some embodiments, for the shortcut operation control displayed on the perimeter of the target thumbnail, the user may set different target content differently, and the terminal provides a corresponding setting entry in the camera interface.

Figure 5:
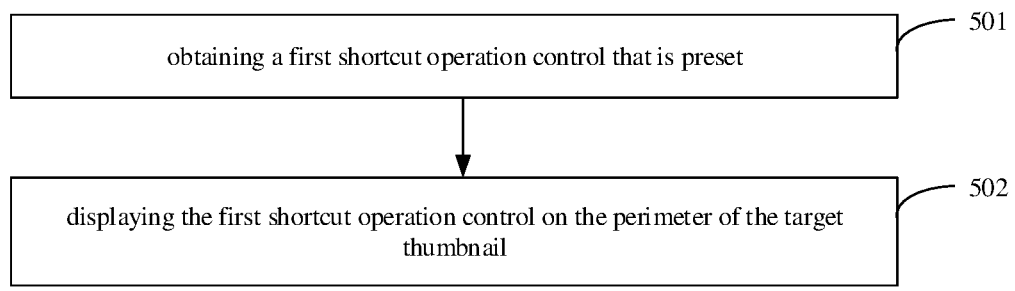
FIG. 5 is a flowchart of a method for displaying a shortcut operation control according to an embodiment of the present disclosure.

Schematically, as shown in FIG. 5, FIG. 5 is a flowchart of a method for displaying a shortcut operation control according to an embodiment of the present disclosure. The method includes operations at blocks illustrated herein.

At block 501: obtaining a first shortcut operation control that is preset.

In some embodiments, the terminal provides an entry for setting the shortcut operation control in the camera interface, for example, a setting entry. When the user clicks the setting entry, the user can enter the setting interface. In the setting interface, there are multiple candidate shortcut operation controls, the user may choose whether to display the shortcut operation controls on the perimeter of the target thumbnail.

In some embodiments, for different target content, the user may set different shortcut operation controls. For example, when the target content is a photo, the user may set the corresponding shortcut operation control as: sharing control, image identification control, image editing control, etc.; when the target content is a video, the user may set the corresponding shortcut operation control as: short video sharing applications, short video production controls, etc.

Figure 6:
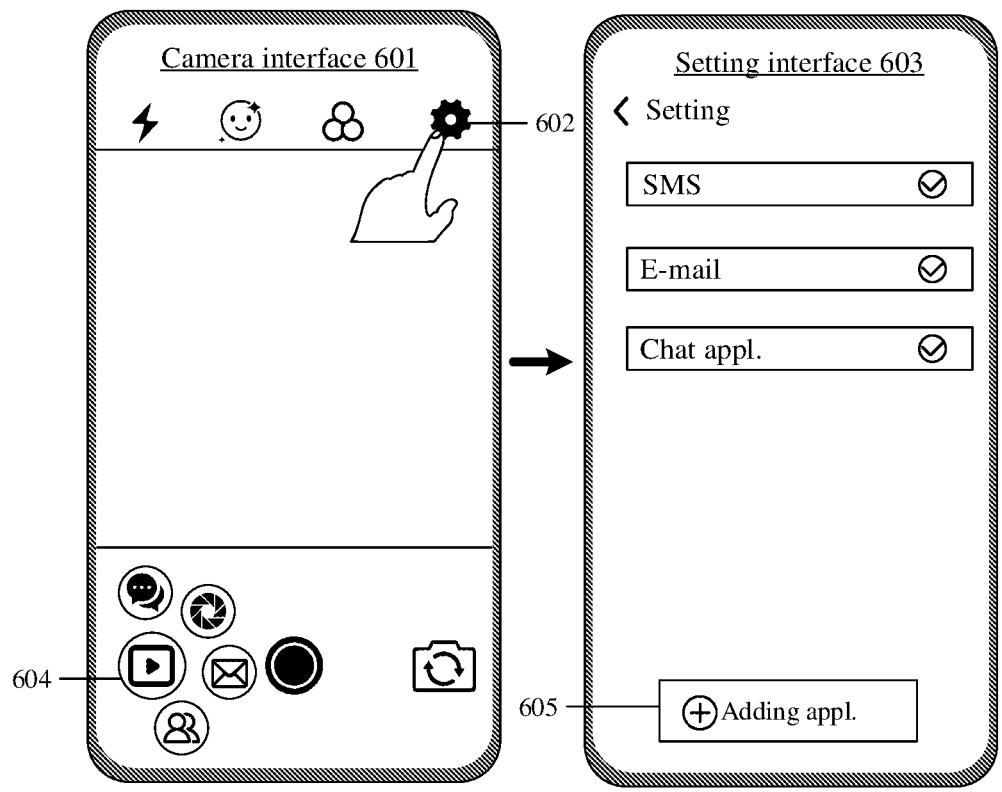
FIG. 6 is a schematic process view of setting a first shortcut operation control according to an embodiment of the present disclosure.

Schematically, as shown in FIG. 6, FIG. 6 is a schematic process view of setting a first shortcut operation control according to an embodiment of the present disclosure. The camera interface 601 contains a setting control 602. The user may click the setting control 602. When the terminal receives a click operation on the setting control 602 in the camera interface 601, a setting interface 603 may be displayed, and the user may complete the setting operation of the shortcut operation control of the target thumbnail 604 in the setting interface 603. The user may click an adding application control 605 to add a candidate shortcut operation control in the setting interface 603.

At block 502: displaying the first shortcut operation control on the perimeter of the target thumbnail.

In some embodiments, after the user finishes setting the shortcut operation control, the terminal may store the target content in association with the corresponding shortcut operation control, such that when the terminal receives the trigger operation on the target thumbnail, the first shortcut operation control may be displayed on the perimeter of the target thumbnail.

In the embodiments, the terminal provides a setting entry for the shortcut operation control. In this way, the user may click the setting entry, and the terminal displays the setting interface corresponding to the setting entry, such that the user may perform the setting operation on the shortcut operation control in the setting interface. Therefore, when the terminal subsequently receives the trigger operation on the target thumbnail, it displays the preset first shortcut operation control on the perimeter of the target thumbnail.

In other embodiments, the developer may set corresponding shortcut operation controls according to the target contents of different content types, and store a correspondence table of the content types and the shortcut operation controls in the terminal in advance, such that subsequent terminals may subsequently find a shortcut operation control corresponding to the target content according to the correspondence table and display accordingly.

Figure 7:
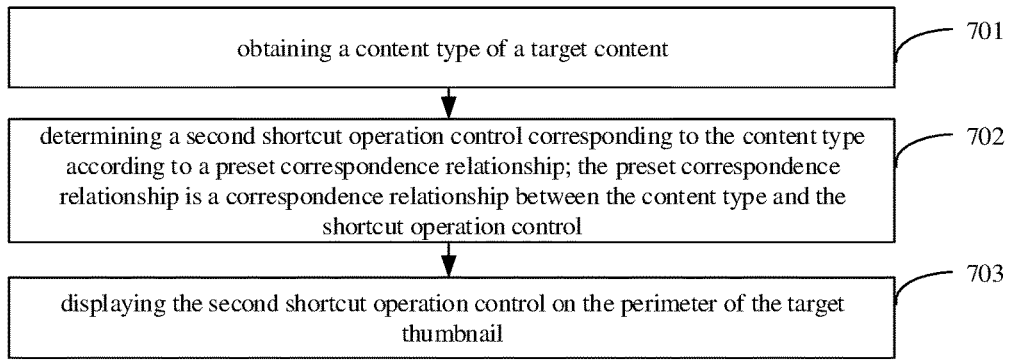
FIG. 7 is a flowchart of a display process of a shortcut operation control according to another embodiment of the present disclosure.

Schematically, as shown in FIG. 7, FIG. 7 is a flowchart of a display process of a shortcut operation control according to another embodiment of the present disclosure. The process includes operations at blocks illustrated herein.

At block 701: obtaining a content type of a target content.

The content type may include a text picture, a scene picture, a portrait picture, a short video, a long video, etc. The embodiments of the present disclosure do not limit the content types.

In some embodiments, when the terminal receives a trigger operation on a target thumbnail, the terminal may first determine the content type of the target content, for example, the target content is a text picture.

At block 702: determining a second shortcut operation control corresponding to the content type according to a preset correspondence relationship; the preset correspondence relationship is a correspondence relationship between the content type and the shortcut operation control.

The preset correspondence relationship may be preset by the developer, or obtained by the terminal according to collected terminal data, or customized by the user according to needs, which is not limited in the embodiments.

In some embodiments, after the terminal obtains the content type corresponding to the target content, the terminal may search in the preset correspondence relationship table to determine the second shortcut operation control corresponding to the content type.

Regarding the obtaining method of the preset correspondence relationship, in some embodiments, the terminal may collect historical operation information performed on a sample content to determine the shortcut operation control corresponding to the content type corresponding to the sample content.

Schematically, the method for obtaining the preset correspondence relationship may include the following steps.

1. Obtaining a historical operation on a sample content; the historical operation is an operation performed on the sample content in a user interface other than the camera interface.

In some embodiments, the terminal may collect operational data information such as historical operation performed on the sample content during a use process, determine the historical operation performed on the sample content with a higher frequency from the operational data information, and determine the historical operation corresponding to the sample content.

Schematically, when the terminal frequently receives the sharing operation of the target picture in the album interface, the sharing operation may be determined as the historical operation of the target picture.

2. Updating the preset correspondence relationship according to a content type corresponding to the sample content and the shortcut operation control corresponding to the historical operation.

In some embodiments, the terminal may first determine the content type corresponding to the sample content according to the obtained historical operation information of the sample content, and determine the shortcut operation control corresponding to the historical operation, such that the content type is associated with the shortcut operation control and stored in a preset correspondence relationship table as the preset correspondence relationship.

Schematically, the correspondence relationship table between the content type and the second shortcut operation control may be as shown in Table 1.

TABLE 1

| Content type | Shortcut operation control |
| --- | --- |
| Text picture | Sharing control, text editing control, text identification control |
| Short video | Uploading control, sharing control, video production control |
| Portrait picture | Face identification control, portrait beauty control, sharing control |
| ... | ... |

Schematically, when the terminal obtains the content type corresponding to the target content as a portrait picture, the terminal may search in Table 1 to obtain that the second shortcut operation control corresponding to the target thumbnail may be a face identification control, a portrait beauty control, a sharing control, etc.

At block 703: displaying the second shortcut operation control on the perimeter of the target thumbnail.

In some embodiments, after the terminal determines the second operation control corresponding to the target content, the second shortcut operation control may be displayed on the perimeter of the target thumbnail.

Since the display region for the second shortcut operation control in the camera interface is limited, to display more second shortcut operation controls and avoid blocking the viewfinder screen, in some embodiments, a hierarchical display mode may be adopted.

Figure 8:
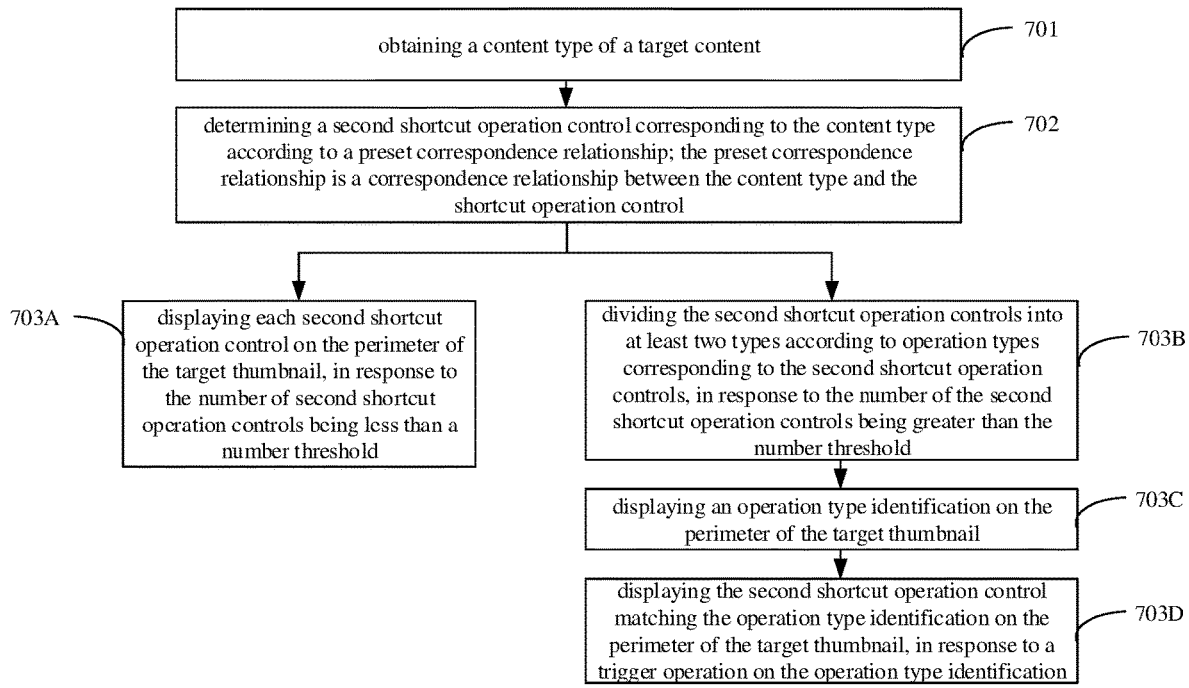
FIG. 8 is a flowchart of a display process of a shortcut operation control according to further another embodiment of the present disclosure.

In some embodiments, schematically, on the basis of FIG. 7, as shown in FIG. 8, step 703 may include step 703A to step 703D.

At block Step 703A: displaying each second shortcut operation control on the perimeter of the target thumbnail, in response to the number of second shortcut operation controls being less than a number threshold.

The number threshold may be set by the developer, and the number threshold is set in consideration of factors such as the size of a region that can be used to display the shortcut operation control in the camera interface, and the size of the shortcut operation control. For example, under the premise of not blocking the viewfinder screen, the number threshold may be four.

In some embodiments, when the terminal determines that the number of second shortcut operation controls is less than the number threshold, for example, if there are three second shortcut operation controls, each second shortcut can be directly displayed on the perimeter of the target thumbnail. Operation controls.

At block 703B: dividing the second shortcut operation controls into at least two types according to operation types corresponding to the second shortcut operation controls, in response to the number of the second shortcut operation controls being greater than the number threshold.

Different shortcut operation controls may correspond to different operation types, for example, the sharing operation may correspond to different shortcut operation controls. Among them, different shortcut operation controls may correspond to different sharing interfaces (for example, different sharing functions in different applications or different sharing portals within the same application). Therefore, in some embodiments, when the number of the second shortcut operation controls is greater than the number threshold, in order to display the second shortcut operation controls more comprehensively, the second operation controls may be categorized according to the operation type, and the second shortcut operation controls are displayed hierarchically according to the divided categories.

The operation types may include content sharing, content editing, and content identifying.

It should be noted that the process of dividing the operation types of the second shortcut operation controls may be performed in the background in advance by the terminal, and there is no need to divide the operation types in real time during the application process.

At block 703C: displaying an operation type identification on the perimeter of the target thumbnail.

In some embodiments, after the second shortcut operation controls are categorized, the operation type identifications corresponding to different operation types may be displayed on the perimeter of the target thumbnail.

Figure 9:
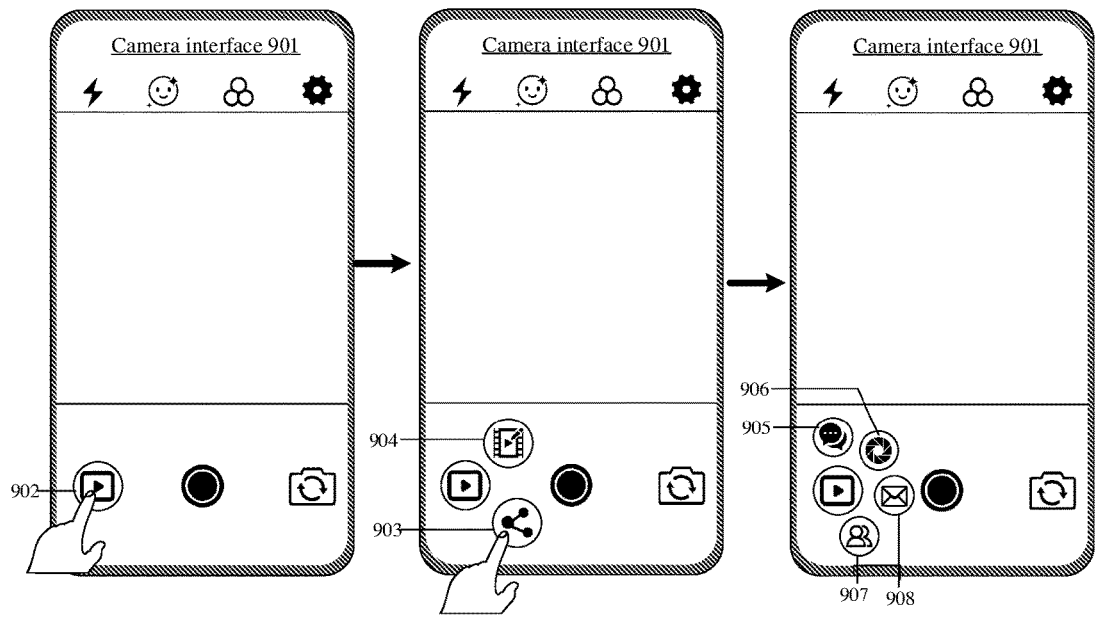
FIG. 9 is a schematic process view of displaying a shortcut operation control according to an embodiment of the present disclosure.

Schematically, as shown in FIG. 9, after the user clicks on the target thumbnail 902 in the camera interface 901, and the terminal receives a trigger operation on the target thumbnail 902, a first operation type identification 903 (content editing operation) and a second operation type identification 904 (content sharing operation) are displayed on the perimeter of the target thumbnail 902 and.

At block 703D: displaying the second shortcut operation control matching the operation type identification on the perimeter of the target thumbnail, in response to a trigger operation on the operation type identification.

In some embodiments, the user may click the operation type identification, and the terminal receives the trigger operation on the operation type identification, then the second shortcut operation control matching the operation type identification may be displayed on the perimeter of the target thumbnail, thereby realizing the hierarchical display of the second shortcut operation control. After receiving the trigger operation on the operation type identification, the operation type identification stops being displayed.

Schematically, as shown in FIG. 9, when the user clicks on the second operation type identification 903, a first shortcut operation control 905, a second shortcut operation control 906, a third shortcut operation control 907, and a fourth shortcut operation control 908 corresponding to the second operation type identification 903 are displayed on the perimeter of the target thumbnail 902.

In the embodiments, by setting the preset correspondence between the content type and the shortcut operation control, the terminal can determine the second shortcut operation control to be displayed according to the content type of the target content when displaying the shortcut operation control. In addition, by obtaining the historical operation of the sample content, and according to the content type corresponding to the sample content and the shortcut operation control corresponding to the historical operation, the preset correspondence relationship can be updated in real time. Moreover, by setting the number threshold, when the number of the second shortcut operation controls is greater than the number threshold, the second shortcut operation controls may be categorized according to the operation types of the second shortcut operation controls, such that in the process of displaying the second shortcut operation controls, hierarchical display may be realized, so as to display a large number of shortcut controls simultaneously in a limited region.

It should be noted that the hierarchical display of shortcut operation controls may also be applied to the scenario where the first shortcut operation control is preset, that is, the hierarchical display is performed when the number of preset first shortcut operation controls is greater than a number threshold (that is, the operation type identification is displayed first), and the first shortcut operation controls are displayed directly when the number of first shortcut operation controls is less than the number threshold, which will not be repeated in the embodiments.

Since the display of the target content operation interface corresponding to the shortcut operation control may affect the current shooting state of the terminal, in some embodiments, it is necessary to determine how to display the corresponding content operation interface according to the different shooting states of the terminal.

Figure 10:
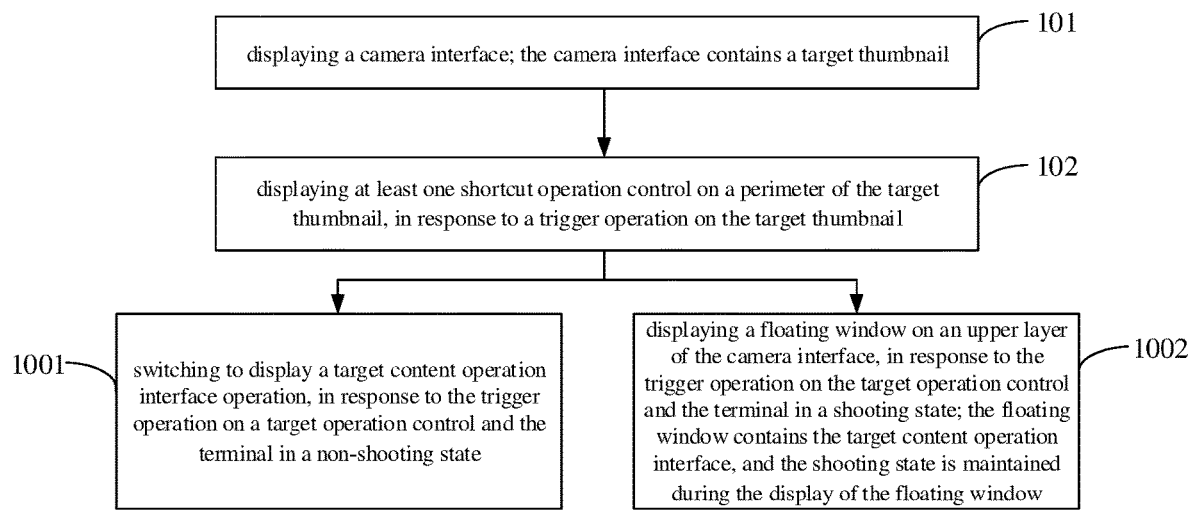
FIG. 10 is a flowchart of a content operation method according to further another embodiment of the present disclosure.

Schematically, on the basis of FIG. 1, as shown in FIG. 10, step 103 may be replaced with step 1001 and step 1002.

At block 1001: switching to display a target content operation interface operation, in response to the trigger operation on a target operation control and the terminal in a non-shooting state.

In some embodiments, when the terminal receives the trigger operation on the target operation control, the terminal first determines whether the terminal is currently in the shooting state, and when the terminal is not in the shooting state, the terminal may directly switch to display the target content operation interface corresponding to the target operation control, which will not affect the current shooting status.

At block 1002: displaying a floating window on an upper layer of the camera interface, in response to the trigger operation on the target operation control and the terminal in a shooting state; the floating window contains the target content operation interface, and the shooting state is maintained during the display of the floating window.

In some embodiments, when it is determined that the terminal is still in the shooting state, if the terminal directly switches to display the content operation interface, the current shooting may be interrupted. In order to avoid affecting the current shooting state, the upper layer of the camera interface may display the floating window, which contains a corresponding target content operation interface, and the user may perform content operations in the content operation interface, and the current shooting state is maintained.

Figure 11:
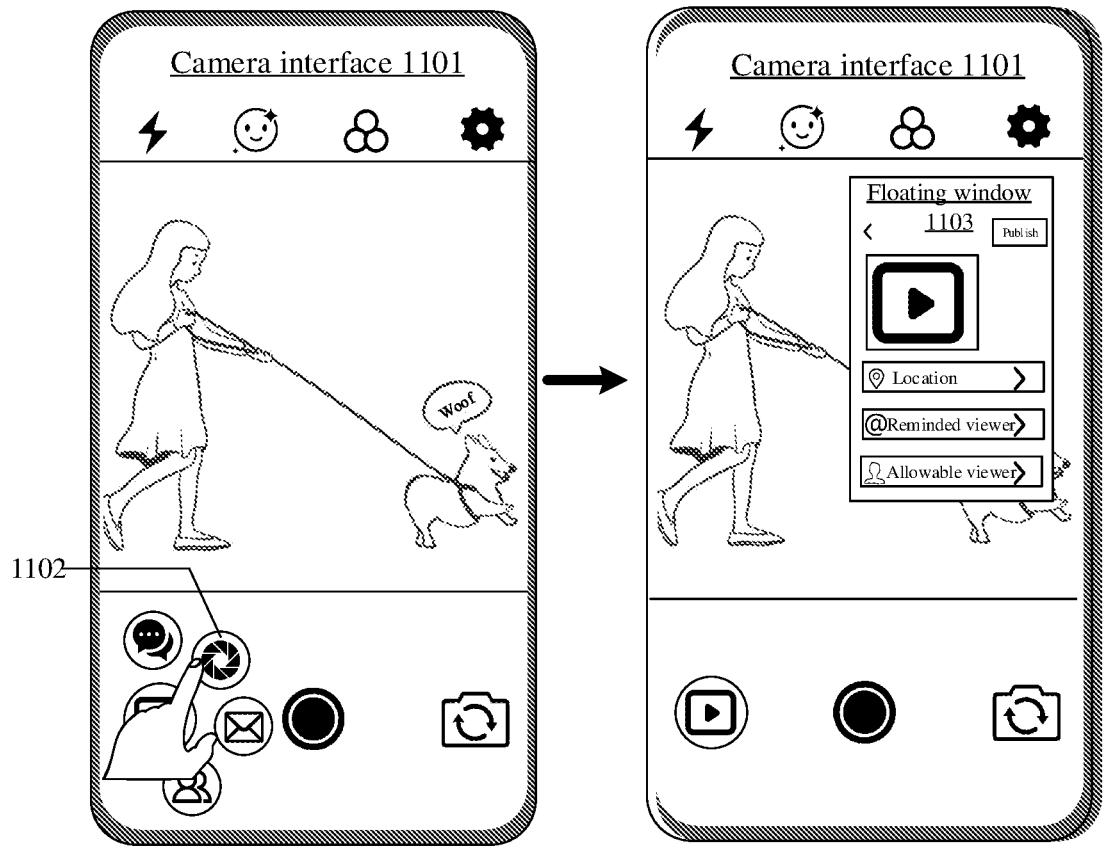
FIG. 11 is a schematic process view of displaying a shortcut operation control according to another embodiment of the present disclosure.

Schematically, as shown in FIG. 11, when the user clicks on the shortcut operation control 1102, the terminal receives the trigger operation on the shortcut operation control 1102 and at the same time identifies that the terminal is still in the shooting state. In this case, a floating window 1103 is displayed on the upper layer of the camera interface 1101, and the sharing interface is displayed in the floating window 1103. The user may perform the sharing operation in the sharing interface, and the current shooting state will not be affected during the sharing operation.

In the embodiments, when the terminal receives the trigger operation on the target operation control, the terminal determines the shooting state of the terminal. When the terminal is determined to be in the shooting state, the terminal displays the target content operation interface in the form of a floating window in the upper layer of the camera interface to avoid shooting interruption and a poorer experience to the user caused by directly switching to display the target content operation interface on the shooting state.

In some embodiments, due to the limited region of the camera interface for displaying the shortcut operation controls, the shortcut operation control may overlap with some shooting controls in the original camera interface, resulting in mis-operation of the shooting control when the shortcut operation control is clicked. In some embodiments, when the shortcut operation control is displayed, the display of other shooting controls may be stopped to avoid mis-operation of the shooting controls.

Figure 12:
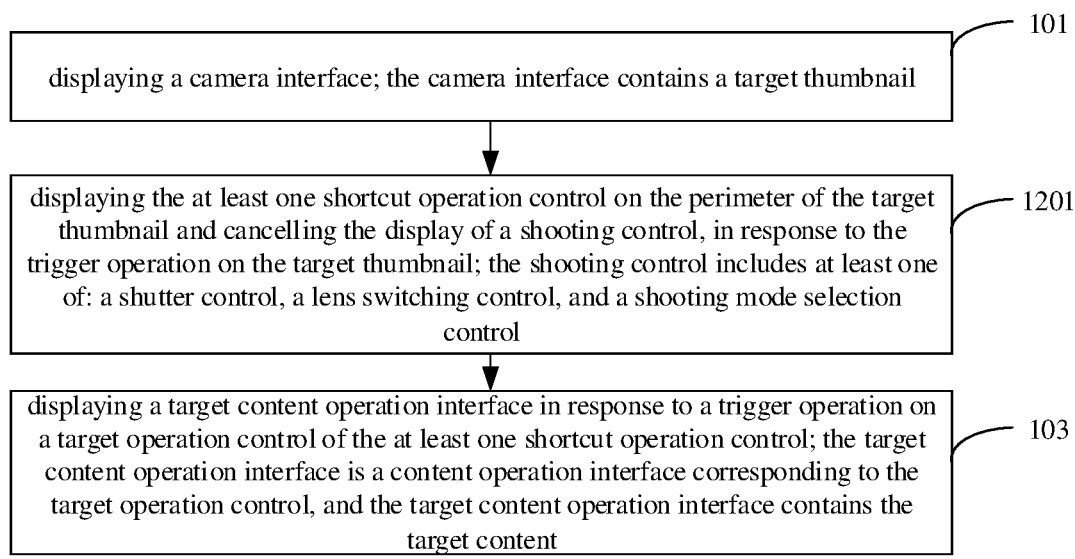
FIG. 12 is a flowchart of a content operation method according to further another embodiment of the present disclosure.

Schematically, on the basis of FIG. 1, as shown in FIG. 12, step 102 may be replaced with step 1201.

Step 1201: displaying the at least one shortcut operation control on the perimeter of the target thumbnail and cancelling the display of a shooting control, in response to the trigger operation on the target thumbnail; the shooting control includes at least one of: a shutter control, a lens switching control, and a shooting mode selection control.

Since the region where the shortcut operation controls are displayed in the camera interface is relatively close to the shooting controls in the camera interface, in order to avoid mis-operation of the original shooting controls in the camera interface when the user clicks on the shortcut operation controls, in some embodiments, when the terminal receives the trigger operation on the target thumbnail and displays the at least one shortcut operation control on the perimeter of the target thumbnail, the terminal cancels the display of some of the original shooting controls in the camera interface, such as shutter control, lens switching control, and shooting mode selection control, etc.

Figure 13:
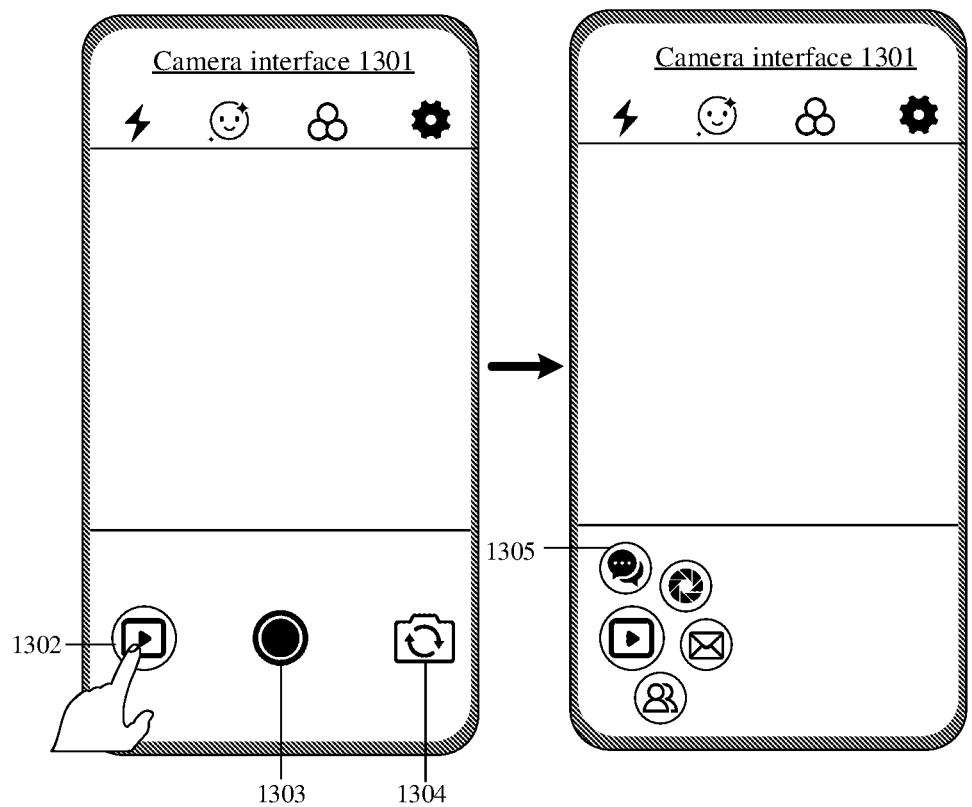
FIG. 13 is a schematic process view of displaying a shortcut operation control according to further another embodiment of the present disclosure.

Schematically, as shown in FIG. 13, the camera interface 1301 displays a target thumbnail 1302, a shutter control 1303, and a lens switching control 1304. When the user clicks the target thumbnail 1302, the terminal receives a trigger operation on the target thumbnail 1302, displays the at least one shortcut control 1305 on the perimeter of the target thumbnail 1302, and cancels the display of the shooting control, for example, cancels the display of the shutter control 1303 and the lens switching control 1304.

In some embodiments, after the target operation control is triggered and the operation on the target content is completed, when the camera interface is returned, the shooting control in the camera interface is restored to display.

In the embodiments, the display of the original shooting control in the camera interface is canceled while displaying the shortcut operation control, thereby preventing unnecessary cumbersome operations caused by user's mis-operation on the shooting control when the shortcut operation control is triggered.

Figure 14:
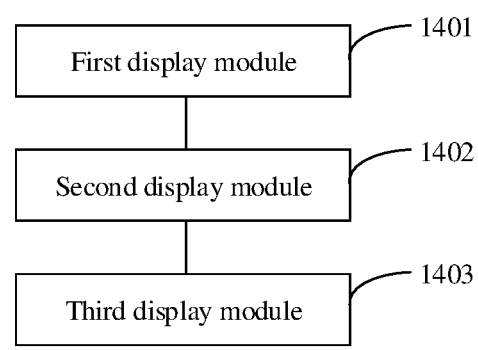
FIG. 14 is a schematic block view of a content operation device according to an embodiment of the present disclosure.

Referring to FIG. 14, FIG. 14 is a schematic block view of a content operation device according to an embodiment of the present disclosure. The device may be implemented as all or a part of the terminal through software, hardware or a combination of the two. The device includes components as followed.

A first display module 1401, configured to display a camera interface; the camera interface contains a target thumbnail, the target thumbnail being a thumbnail corresponding to the target content, and the target content includes a recently taken photo or video.

A second display module 1402, configured to display at least one shortcut operation control on a perimeter of the target thumbnail, in response to a trigger operation on the target thumbnail; and each shortcut operation control is configured to trigger a preset operation on the target content.

A third display module 1403, configured to display a target content operation interface in response to a trigger operation on a target operation control of the at least one shortcut operation control; the target content operation interface is a content operation interface corresponding to the target operation control, and the target content operation interface contains the target content.

In some embodiments, the second display module 1402 includes components as followed.

An obtaining unit, configured to obtain a shooting time of the target content, in response to a trigger operation on the target thumbnail.

A first display unit, configured to display a shortcut operation control on a perimeter of the target thumbnail, in response to a time interval between the shooting time and a current time being less than a first time threshold.

In some embodiments, the third display module 1403 includes components as followed.

A determining unit, configured to determine an associated content corresponding to the target content, in response to a trigger operation on a target operation control and in response to the target operation control being a sharing control; a time interval between a shooting time of the associated content and a shooting time of the target content is less than a second time threshold.

A second display unit, configured to display a target content operation interface; the target content operation interface is a sharing interface, and the sharing interface includes the target content and the associated content.

In some embodiments, the first display unit is further configured to perform the following.

Obtaining a first shortcut operation control that is preset; and displaying the first shortcut operation control on the perimeter of the target thumbnail.

Or, obtaining a content type of a target content, where the content type includes at least one of a text picture, a scene picture, a portrait picture, a short video, and a long video; determining a second shortcut operation control corresponding to the content type according to a preset correspondence relationship, where the preset correspondence relationship is a correspondence relationship between the content type and the shortcut operation control; and displaying the second shortcut operation control on the perimeter of the target thumbnail.

In some embodiments, the first display unit is further configured to perform the following.

Displaying each second shortcut operation control on the perimeter of the target thumbnail, in response to the number of second shortcut operation controls being less than a number threshold.

Dividing the second shortcut operation controls into at least two types according to operation types corresponding to the second shortcut operation controls, in response to the number of the second shortcut operation controls being greater than the number threshold, where the operation types include at least one of: content sharing, content editing and content identifying; displaying an operation type identification on the perimeter of the target thumbnail; and displaying the second shortcut operation control matching the operation type identification on the perimeter of the target thumbnail, in response to a trigger operation on the operation type identification.

In some embodiments, the device further includes components as followed.

An obtaining module, configured to obtain a historical operation on a sample content; the historical operation is an operation performed on the sample content in a user interface other than the camera interface.

An update module, configured to update the preset correspondence relationship according to a content type corresponding to the sample content and the shortcut operation control corresponding to the historical operation.

In some embodiments, the third display module 1403 includes components as followed.

A switching display unit is configured to switch to display a target content operation interface operation, in response to the trigger operation on a target operation control and the terminal in a non-shooting state.

A third display unit, configured to display a floating window on an upper layer of the camera interface, in response to the trigger operation on the target operation control and the terminal in a shooting state; the floating window contains the target content operation interface, and the shooting state is maintained during the display of the floating window.

In some embodiments, the second display module 1402 further includes components as followed.

A fourth display unit, configured to display the at least one shortcut operation control on the perimeter of the target thumbnail and cancelling the display of a shooting control, in response to the trigger operation on the target thumbnail; the shooting control includes at least one of: a shutter control, a lens switching control, and a shooting mode selection control.

In summary, in the embodiments of the present disclosure, after the user performs a shooting operation in the camera interface, the terminal may display the target content obtained by shooting in the camera interface in the form of target thumbnails; when the user needs to perform a preset operation on the target content (for example, sharing operation), he/she may directly click or long press the target thumbnail on the camera interface. When the terminal receives a trigger operation on the target thumbnail, the terminal may display the at least one shortcut operation control which is configured to perform preset operations on the target content. The user may click any shortcut operation control, and the terminal receives the trigger operation on the target operation control in the shortcut operation control for displaying the content operation interface corresponding to the target operation control, such that the user may directly complete the preset operation in the content operation interface. By directly displaying shortcut operation controls on the perimeter of the target thumbnail in the camera interface, the operation of the target content may be completed without switching to the album interface, such that the process of realizing the content operation is reduced and the efficiency of preset operation on the target content is improved compared to the related art.

Figure 15:
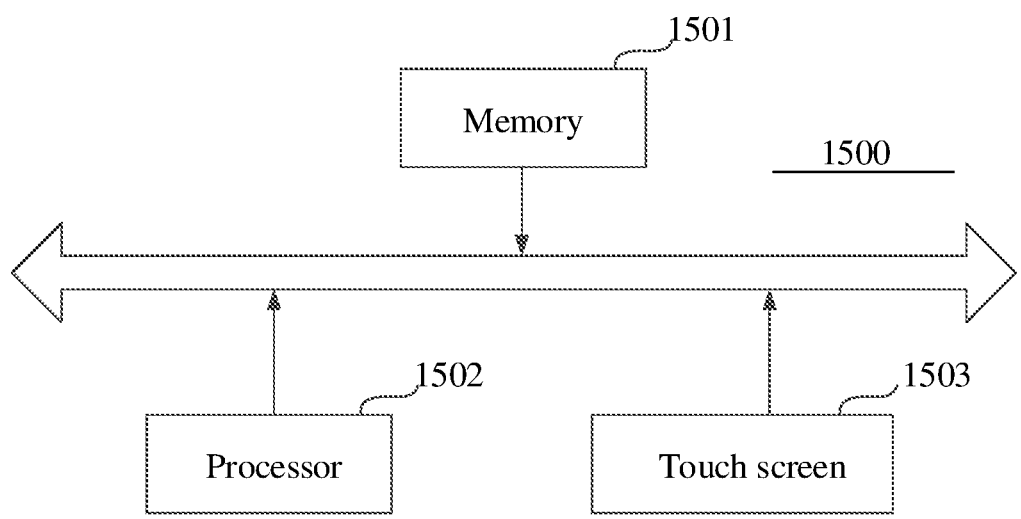
FIG. 15 is a schematic block view of a terminal according to an embodiment of the present disclosure.

Referring to FIG. 15, FIG. 15 is a schematic block view of a terminal 1500 according to an embodiment of the present disclosure. The terminal 1500 may be an electronic device, such as a smartphone, tablet, e-book, portable personal computer, etc., with an application installed and executable. The terminal 1500 in the present disclosure may include one or more of the following components: a processor 1502, a memory 1501, and a touch display 1503.

The processor 1502 may include one or more processing cores. The processor 1502 uses various interfaces and lines to connect various parts within the entire terminal 1500 to perform various functions and process data of the terminal 1500 by running or executing instructions, programs, code sets, or instruction sets stored in the memory 1501, and by calling data stored in the memory 1501. In some embodiments, the processor 1502 may be implemented in at least one of the hardware forms of digital signal processing (DSP), field-programmable gate array (FPGA), and programmable logic array (PLA). The processor 1502 may integrate one or a combination of one or more of a central processing unit (CPU), a graphics processing unit (GPU), and a modem. The CPU primarily handles the operating system, user interface, applications, etc.; the GPU is responsible for rendering and drawing of the content to be displayed by the touch display 1503; and the modem is configured to handle wireless communications. It can be understood that the above modem may be implemented without being integrated into the processor 1502 and through a separate communication chip.

The memory 1501 may include random access memory (RAM), and read-only memory (ROM). In some embodiments, the memory 1501 includes a non-transitory computer-readable storage medium. The memory 1501 may be configured to store instructions, programs, code, code sets, or instruction sets. The memory 1501 may include a storage program region and a storage data region. The storage program region may store instructions for implementing the operating system, instructions for implementing at least one function (such as a touch function, a sound playback function, an image playback function, etc.), instructions for implementing each of the method embodiments described above, etc. The operating system may be an Android system (including systems based on the depth of development of Android system), IOS system developed by Apple (including systems based on the depth of development of IOS system) or other systems. The storage data region may further store data created by the terminal 1500 in use (e.g., phone book, audio and video data, chat log data), etc.

The touch display 1503 is configured to receive touch operations by the user using any suitable object such as a finger, stylus, etc., on or near it, as well as to display a user interface of each application. The touch display is typically provided on a front panel of the terminal 1500. The touch display may be designed as a full screen, a curved screen, or a shaped screen. The touch display may also be designed as a combination of a full screen and a curved screen, and a combination of a shaped screen and a curved screen, which are not limited by embodiments of the present disclosure.

In addition, it will be understood by those skilled in the art that the structure of the terminal 1500 shown in the accompanying drawings above does not constitute a limitation of the terminal 1500, and that the terminal may include more or fewer components than shown, or a combination of certain components, or a different arrangement of components. For example, the terminal 1500 may further include components such as radio-frequency circuitry, a shooting component, a sensor, an audio circuit, a Wireless Fidelity (Wi-Fi) component, a power supply, a Bluetooth component, and other components, which are not described herein.

Embodiments of the present disclosure further provide a computer readable medium having at least one instruction stored thereon, the at least one instruction being loaded and executed by the processor to implement the content operation method as described in the above embodiments.

Embodiments of the present disclosure provide a computer program product or computer program, the computer program product or computer program including computer instructions, the computer instructions being stored in a computer-readable storage medium. A processor of the terminal reads the computer instructions from the computer-readable storage medium, and the processor executes the computer instructions such that the terminal performs the content operation method provided in the above aspect.

Those skilled in the art should be aware that in one or more of the above examples, the functions described in the embodiments of the present disclosure may be implemented with hardware, software, firmware, or any combination thereof. When implemented using software, these functions may be stored in a computer-readable medium or transmitted as one or more instructions or code on a computer-readable medium. The computer-readable medium includes computer storage medium and communication medium, where the communication medium includes any medium that facilitates the transmission of computer programs from one place to another. The storage medium may be any available medium accessible to a general purpose or specialized computer.

The foregoing are only optional embodiments of the present disclosure and are not intended to limit the present disclosure. Any modifications, equivalent replacements, improvements, etc., made within the spirit and principles of the present disclosure shall be included within the scope of the present disclosure.

What is claimed is:

1. A content operation method performed by a terminal, comprising:
    displaying a camera interface; wherein the camera interface contains a target thumbnail, the target thumbnail being a thumbnail corresponding to a target content, the target content comprising a recently taken photo or video;
    displaying at least one shortcut operation control near to the target thumbnail, in response to a trigger operation on the target thumbnail; wherein each shortcut operation control is configured to trigger a certain operation on the target content; and
    displaying a target content operation interface in response to a trigger operation on a target short operation control of the at least one shortcut operation control; wherein the target content operation interface corresponds to the target shortcut operation control, and the target content operation interface contains the target content;
    wherein the displaying at least one shortcut operation control near to the target thumbnail comprises:
    obtaining a first shortcut operation control among the at least one shortcut operation control that is preset according to a setting operation; and
    displaying the first shortcut operation control near to the target thumbnail.

2. The method according to claim 1, wherein the displaying at least one shortcut operation control near to the target thumbnail, in response to a trigger operation on the target thumbnail comprises:
    displaying the at least one shortcut operation control near to the target thumbnail in response to a time interval between a shooting time of the target content and a time of the trigger operation being less than a first time threshold.

3. The method according to claim 2, further comprising:
    not displaying the at least one shortcut operation control near to the target thumbnail and switching to display an interface for previewing the target content, in response to the time interval between the shooting time of the target content and the time of the trigger operation being greater than or equal to the first time threshold.

4. The method according to claim 2, wherein the displaying a target content operation interface in response to a trigger operation on a target shortcut operation control of the at least one shortcut operation control comprises:
    determining an associated content corresponding to the target content, in response to the trigger operation on the target shortcut operation control and in response to the target shortcut operation control being a sharing control; wherein a time interval between a shooting time of the associated content and the shooting time of the target content is less than a second time threshold; and
    displaying the target content operation interface; wherein the target content operation interface is a sharing interface, and the sharing interface comprises the target content and the associated content.

5. The method according to claim 4, wherein the associated content is a content that has a preset degree of similarity to the target content, or the associated content and the target content have same keywords, characters, or scenery.

6. The method according to claim 1, wherein the displaying at least one shortcut operation control near to the target thumbnail comprises:
    obtaining a content type of the target content; wherein the content type comprises at least one of: a text picture, a scene picture, a portrait picture, a short video, and a long video;
    determining at least one second shortcut operation control corresponding to the content type according to a preset correspondence relationship; wherein the preset correspondence relationship is a correspondence relationship between each shortcut operation control and the content type of the each shortcut operation control; and
    displaying the at least one second shortcut operation control near to the target thumbnail.

7. The method according to claim 6, wherein the displaying the at least one second shortcut operation control near to the target thumbnail comprises:

displaying each second shortcut operation control near to the target thumbnail, in response to the number of the at least one second shortcut operation control being less than a number threshold;

dividing the at least one second shortcut operation control into at least two types according to operation types corresponding to the at least one second shortcut operation control, in response to the number of the at least one second shortcut operation control being greater than the number threshold; wherein the operation types comprise at least one of: content sharing, content editing, and content identifying;

displaying an operation type identification near to the target thumbnail; and displaying at least one of the at least one second shortcut operation control matching the operation type identification near to the target thumbnail, in response to a trigger operation on the operation type identification.

8. The method according to claim 6, further comprising:

obtaining a historical operation on a sample content; wherein the historical operation is performed on the sample content in a user interface other than the camera interface; and updating the preset correspondence relationship according to a content type corresponding to the sample content and a corresponding shortcut operation control corresponding to the historical operation.

9. The method according to claim 1, wherein the displaying a target content operation interface in response to a trigger operation on a target shortcut operation control of the at least one shortcut operation control comprises:

switching to display the target content operation interface operation, in response to the trigger operation on the target shortcut operation control and the terminal being in a non-shooting state; and displaying a floating window on an upper layer of the camera interface, in response to the trigger operation on the target shortcut operation control and the terminal being in a shooting state; wherein the floating window contains the target content operation interface, and the shooting state is maintained during a display of the floating window.

10. The method according to claim 1, wherein the displaying at least one shortcut operation control near to the target thumbnail, in response to a trigger operation on the target thumbnail comprises:

displaying the at least one shortcut operation control near to the target thumbnail and cancelling a display of a shooting control, in response to the trigger operation on the target thumbnail; wherein the shooting control comprises at least one of: a shutter control, a lens switching control, and a shooting mode selection control.

11. The method according to claim 10, further comprising:

restoring to display the shooting control after the trigger operation is completed, in response to the camera interface being switched to display.

12. The method according to claim 1, wherein the certain operation comprises at least one of: a content sharing operation, a content editing operation, and a content identifying operation.

13. The method according to claim 1, wherein the displaying at least one shortcut operation control near to the target thumbnail, in response to a trigger operation on the target thumbnail comprises:

displaying the at least one shortcut operation control near to the target thumbnail and in a region outside a viewfinder screen.

14. The method according to claim 1, wherein the camera interface comprises an entry for setting the at least one shortcut operation control to be displayed among candidate shortcut operation controls.

15. A terminal, comprising a processor and a memory; wherein the memory stores at least one instruction configured to be executed by the processor to perform:

displaying a camera interface; wherein the camera interface contains a target thumbnail, the target thumbnail being a thumbnail corresponding to a target content, the target content comprising a recently taken photo or video;

displaying at least one shortcut operation control near to the target thumbnail, in response to a trigger operation on the target thumbnail; wherein each shortcut operation control is configured to trigger a certain operation on the target content; and displaying a target content operation interface in response to a trigger operation on a target shortcut operation control of the at least one shortcut operation control; wherein the target content operation interface corresponds to the target shortcut operation control, and the target content operation interface contains the target content;

wherein the displaying at least one shortcut operation control near to the target thumbnail comprises:

obtaining a first shortcut operation control among the at least one shortcut operation control that is preset according to a setting operation; and displaying the first shortcut operation control near to the target thumbnail.

16. The terminal according to claim 15, wherein the displaying at least one shortcut operation control near to the target thumbnail comprises:

obtaining a content type of the target content; wherein the content type comprises at least one of: a text picture, a scene picture, a portrait picture, a short video, and a long video;

determining at least one second shortcut operation control corresponding to the content type according to a preset correspondence relationship; wherein the preset correspondence relationship is a correspondence relationship between each shortcut operation control and the content type of each shortcut operation control; and displaying the at least one second shortcut operation control near to the target thumbnail.

17. The terminal according to claim 16, wherein the displaying the at least one second shortcut operation control near to the target thumbnail comprises:

displaying each second shortcut operation control near to the target thumbnail, in response to the number of the at least one second shortcut operation control being less than a number threshold;

dividing the at least one second shortcut operation control into at least two types according to operation types corresponding to the at least one second shortcut operation control, in response to the number of the at least one second shortcut operation control being greater than the number threshold; wherein the operation types comprise at least one of: content sharing, content editing, and content identifying;

displaying an operation type identification near to the target thumbnail; and displaying at least one of the at least one second shortcut operation control matching the operation type identification near to the target thumbnail, in response to a trigger operation on the operation type identification.

18. A non-transitory computer-readable storage medium of a terminal, storing at least one instruction configured to be executed by a processor to perform:
- displaying a camera interface; wherein the camera interface contains a target thumbnail, the target thumbnail being a thumbnail corresponding to a target content, the target content comprising a recently taken photo or video;
- displaying at least one shortcut operation control near to the target thumbnail, in response to a trigger operation on the target thumbnail; wherein each shortcut operation control is configured to trigger a preset operation on the target content; and
- displaying a target content operation interface in response to a trigger operation on a target shortcut operation control of the at least one shortcut operation control; wherein the target content operation interface corresponds to the target shortcut operation control, and the target content operation interface contains the target content;

wherein the displaying at least one shortcut operation control near to the target thumbnail comprises:
- obtaining a first shortcut operation control among the at least one shortcut operation control that is preset according to a setting operation; and
- displaying the first shortcut operation control near to the target thumbnail.

19. The non-transitory computer-readable storage medium according to claim 18, wherein the displaying a target content operation interface in response to a trigger operation on a target shortcut operation control of the at least one shortcut operation control comprises:
- switching to display the target content operation interface operation, in response to the trigger operation on the target shortcut operation control and the terminal being in a non-shooting state; and
- displaying a floating window on an upper layer of the camera interface, in response to the trigger operation on the target shortcut operation control and the terminal being in a shooting state; wherein the floating window contains the target content operation interface, and the shooting state is maintained during a display of the floating window.

* * * * *